3,248,173
PREGNANCY TEST
John E. Stauch, 5625 Elmenford Drive, Suitland 23, Md.
Filed Jan. 31, 1963, Ser. No. 255,326
5 Claims. (Cl. 23—230)

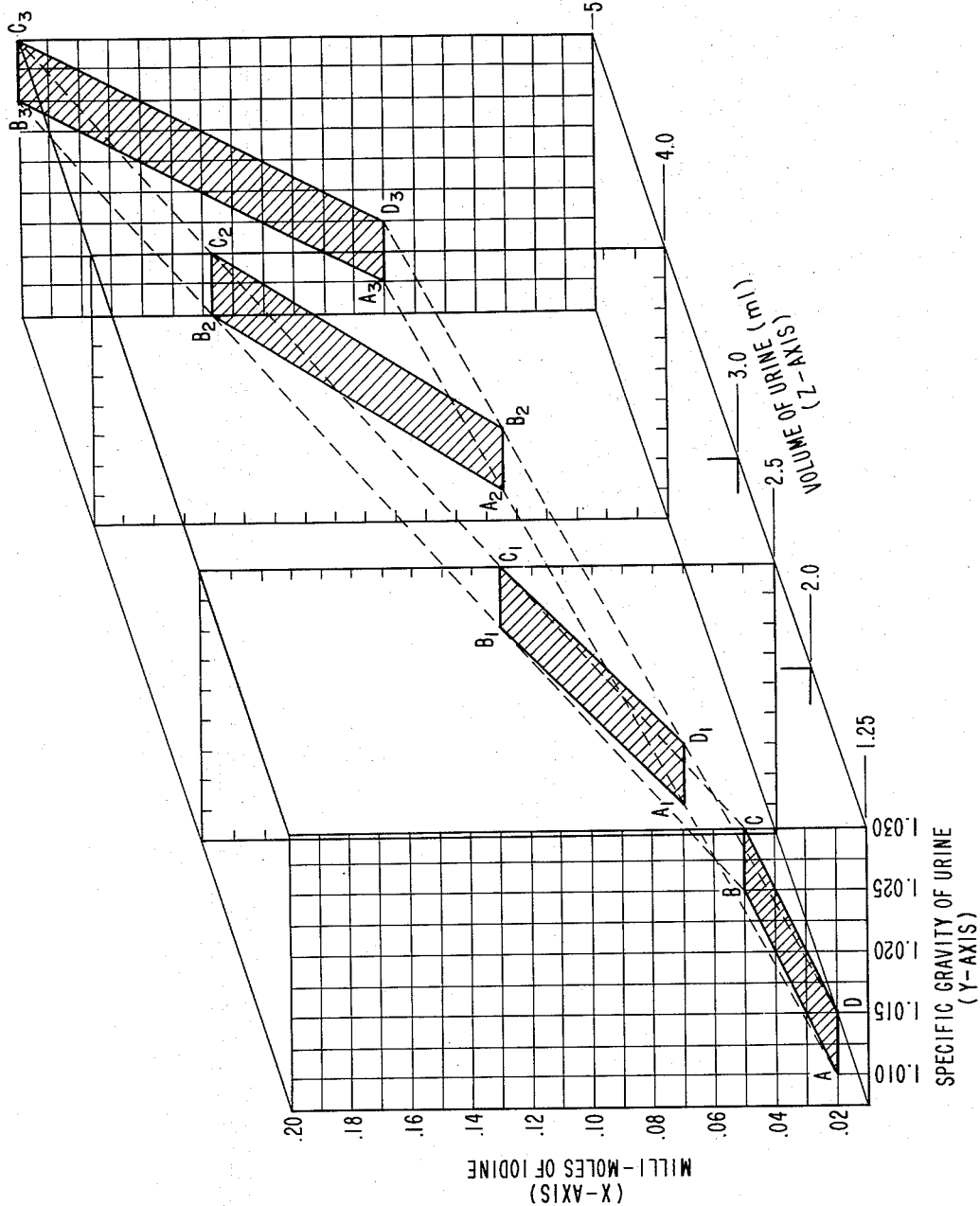

This application is a continuation-in-part of application Serial No. 29,173, filed May 16, 1960, now abandoned.

This invention relates to a method of testing female urine to determine pregnancy.

There have been various tests of a biological or chemical nature proposed as means for determining pregnancy in women. Among the biological tests employed in the past, there are the rat, rabbit and frog as well as the prostigmin skin test. These tests as well as some lesser used chemical tests have suffered from one or more drawbacks including the complex nature of many of the tests, lack of reliability, relatively large expense and the requirement for an expenditure of a rather long length of time.

It is an object of the present invention to provide a simple, inexpensive and rapid method for testing female urine to determine pregnancy.

It is a further object of this invention to provide such a method which offers a high order of reliability.

It is a further object of this invention to provide a method for testing urine to determine pregnancy which requires no elaborate chemical or biological apparatus or agents.

A further object of this invention is to provide such a method which may be employed by relatively unskilled or semi-skilled personnel during a patient's visit, for example, to the doctor's office, clinic or laboratory.

The foregoing and additional objects and advantages of the invention will be apparent from the following detailed description.

The present invention is a modification of the known method devised by Simola and Norvanin (Reaction Coloree des Urines de Gross, Svem Kimist, 9:B20 (1939)) who found that when iodine was added to urine from a pregnant woman and heated to boiling, a raspberry color developed while the urine of nonpregnant women when so treated remained yellow in color. This method though modified somewhat by later workers in the field, such as by employing a solution of iodine and potassium iodide with a corn starch suspension as an indicator system, has not been widely employed because the color change which occurs during the test is very transient, and if heat is applied too rapidly, the color change may be so quick that it is missed. Moreover, the test has required careful and close correlation of test solution concentrations with the particular pH and specific gravity of the urine each time a test was conducted.

The present invention comprises a method wherein a strip of chromatographic paper or similar highly purified and adsorbent paper having any desired size or shape, is impregnated with a predetermined quantity of iodine whereupon the strip is dried. The female urine may then be tested to determine pregnancy merely by placing the impregnated paper in a sample of the urine and heating the same. If a positive reaction occurs, the paper becomes raspberry pink, while if the result is negative, the brownish-yellow tinted paper becomes a white or yellowish beige.

It has been determined that the efficacy of the iodine test is related to the pH of the urine being tested, and the maximum pH used should be approximately 6.5 while the minimum pH may be 2 or less. The preferred range is 5-6. The quantity of iodine necessary to elicit the reaction and produce the desired color change is dependent on the specific gravity and the volume of the urine sample being tested.

The 3-dimensional graph shown on the accompanying drawing depicts the relationship between the milli-moles of iodine placed on a particular strip of paper to the specific gravity of the urine being tested in relation to the volume of urine employed for the test. It will be noted that four shaded parallelograms are shown with a dashed line connecting the corresponding corners of these parallelograms to define a 3-dimensional figure. Parallelogram A–B–C–D shows the relationship between the milli-moles of iodine employed and the specific gravity of the urine at a volume of 1.25 milliliters. Parallelogram $A_1$–$B_1$–$C_1$–$D_1$ shows the relationship between milli-moles of iodine and the specific gravity of the urine at 2.5 milliliters of urine. Parallelogram $A_2$–$B_2$–$C_2$–$D_2$ shows the relationship at 4 milliliters of urine, and parallelogram $A_3$–$B_3$–$C_3$–$D_3$ shows the relationship at 5 milliliters of urine. It will be readily seen that a plane erected parallel to the plane defined by the X and Y axes at any point along the Z axis will result in cutting the 3-dimensional figure to create a section representing the relationship of iodine quantity to urine specific gravity corresponding to that particular point on the Z or urine volume axis. Four of such sections have been shown in the form of shaded parallelograms as indicated above.

It should be noted that though the range of volume of urine shown is from 1.25 to 5.0 milliliters, this is merely for convenience and the volume of urine tested may be reduced or increased still further to any desired practical limit in which case the extending of the dashed lines of the 3-dimensional figure in either direction would permit erecting a parallelogram at any higher or lower point on the Z axis. Accordingly, when defining the relationship of iodine quantity to specific gravity in terms of the graph, it is intended that this relationship include greater or lesser volumes of urine not specifically included on the graph.

In a preferred embodiment of the present invention, chromatographic paper strips are impregnated with a predetermined amount of iodine-potassium iodide solution ($d_2KI$) (5 gm. iodine, 10 gm. potassium iodide and enough water to make 100 ml. of solution). The potassium iodide utilized in preparing this solution is, of course, present only for the purpose of rendering the iodine soluble. The desired iodine solution may otherwise be prepared for impregnating the paper strips. The strips are allowed to dry and are utilized as dry strips in the test.

The particular impregnated and dried strip which is to be employed in testing a given sample of urine is determined by matching a particular strip to a woman's urine sample of a given specific gravity as shown on the accompanying graph. The following table has been derived empirically and shows the appropriate strip to be employed with samples of urine having the listed range of specific gravity when using 2.5 mls. of urine.

| Specific Gravity of Urine | Strip | Millimoles $I_2$ |
|---|---|---|
| 1.010–1.015 | #1 (.20 ml. $I_2KI$) | .04 |
| 1.016–1.020 | #2 (.30 ml. $I_2KI$) | .06 |
| 1.021–1.025 | #3 (.40 ml. $I_2KI$) | .08 |
| 1.026–1.030 | #4 (.50 ml. $I_2KI$) | .10 |

The above ranges of specific gravity have been found to encompass the ranges normally found in urine. If samples of urine with higher specific gravity than the upper limit listed above are to be tested, such samples may be diluted with water to obtain a desired specific gravity. Since it has been found in practice that results are less reliable when testing urine showing a specific gravity below 1.01, any urine showing such low specific gravity should be boiled to evaporate water and thus raise the specific gravity to the desired value or a further sample of urine should be obtained. In practice, specific gravity is easily and readily determined by use of a urinometer, a well-known device.

It has been established that the highest accuracy in utilizing the present test is obtained by maintaining the pH of the urine sample to be tested between 5 and 6. In preferred embodiments of the present invention the testing of the urine may be done in either of two ways. In one method freshly passed urine is tested with a urinometer to determine the specific gravity of the urine. A predetermined volume of urine is placed in a culture tube. The pH of the sample is tested such as with pH paper and adjusted to pH 5 to 6 by adding drops of 10% acetic acid or 10% sodium hydroxide or other acids or bases. The appropriate impregnated strip, i.e., the strip corresponding to the determined specific gravity and predetermined volume as outlined in the accompanying graph, is placed in the tube and the reagents mixed by gently shaking the tube. The tube is gently heated to boiling either over a direct flame or in water. If a positive reaction occurs, the filter paper becomes raspberry pink. If a negative reaction is present, the filter paper becomes white or yellow tinted.

In an alternative method, the urine sample of known specific gravity and proper pH is heated to boiling, and then the appropriate impregnated strip is added. The reaction, if positive, occurs instantly and the paper turns raspberry pink.

The following specific examples are presented to further and more fully illustrate the present invention. It will be apparent to those skilled in the art that various modifications of the invention may be made without departing from the spirit and scope thereof.

The impregnated testing strips used in the examples were prepared in the following manner:

High grade chromatographic paper, manufactured by Schleicher and Schuell of Keene, New Hampshire and identified as Chromatographic Paper No. 470, was cut into strips measuring ¼ inch by 4½ inches. Chromatographic paper is made of cellulose fibers and is substantially free of background fluorescence as well as metals and other contaminants. It is made in such a manner that there is a uniformity from batch to batch with respect to its reproducibility of structure, loading capacity, adsorption and flow rate. Though it is preferred to use chromatographic paper of the nature just described, it is also possible to carry out the present invention with similar highly purified cellulosic paper having high adsorption properties. Eight of these strips were placed on a wire grid and each wetted with $I_2KI$ solution from an appropriately calibrated pipette. Each of the eight strips was impregnated with multiples of 0.02 milli-moles of iodine so as to produce four pairs of strips each pair having one of the four quantities of iodine listed in the above table. The solution employed contained 5 gm. iodine, 10 gm. potassium iodide and enough water to make 100 ml. of solution. The strips were then allowed to dry at room temperature and placed in labeled dark bottles. The strips prepared in this manner have been found to remain stable for at least 4 months.

*Example I*

2.5 ml. of a fresh urine sample from a pregnant woman, said urine having a specific gravity of 1.018 and a pH of 5.5 was pipetted into a 15 x 150 mm. test tube, and a No. 2 strip (above table) was added to the liquid. Approximately one-half of the strip protruded above the liquid. The sample was gently shaken and heated over a flame, whereupon at the end of 55 seconds the paper had changed from a yellow-brown tinted color to a raspberry pink.

*Example II*

2.5 ml. of fresh urine having a specific gravity of 1.024 and pH of 7.6 was added to a test tube as in Example I. Two drops of 10% acetic acid were added whereupon the pH of the urine was measured and found to be 5.8. Test strip No. 3 (above table) was then added to the test tube and the liquid gently agitated while heating moderately over a flame. In 63 seconds a positive reaction was evidenced by the development of a deep pink color on the paper.

*Example III*

5.0 ml. of urine sample having a specific gravity of 1.014 and a pH of 6 was added to a test tube in the manner described above in Example I. Test strip No. 3 (above table) containing 0.08 milli-moles of iodine was added to the sample and the contents of the tube gently shaken while heating gently over a flame. A positive reaction was indicated by the development of a pink color on the paper in 30 seconds.

*Example IV*

In this example, the same urine sample as tested in Example II was used in a quantity of 1.25 ml. with the specific gravity of 1.024 and pH of 5.8 being the same. Paper No. 1 (above table) containing 0.04 milli-moles of iodine was added to the tube and the liquid gently agitated while heating moderately over a flame. A positive reaction was evidenced by the development of a deep pink color within 60 seconds.

*Example V*

To show the differences in characteristics of a negative reaction, a fresh urine sample obtained from a non-pregnant woman was measured into a test tube as described in the previous examples. The urine of specific gravity 1.028 had a pH of 4.5, which pH was adjusted to 6.0 by adding one drop of 10% sodium hydroxide. Test strip No. 4 (above table) was added to the sample which was gently agitated and heated over a flame. After two minutes of heating the iodine tinted strip had turned white and the urine sample had become iodine tinted.

In the above described tests the quantity of urine, the amount of iodine and the specific gravity of the urine were all related as described previously and as shown on the accompanying graph. It is apparent that larger or smaller samples of urine may be tested with appropriate variations in the amount of iodine employed in the tests. As disclosed in copending application Serial No. 29,173 filed May 16, 1960, it is also possible to modify the above described tests by including on the impregnated paper strip a spot of starch suspension to indicate that all of the iodine present has reacted with the reactive constituents of the urine. However, it has been found unnecessary to the practice of the invention to utilize such indicating means.

To summarize briefly, the present invention relates to a novel method of testing female urine to determine pregnancy. A highly purified paper strip is impregnated with a predetermined quantity of iodine. The strip is dried and used for testing the urine by immersing the same in the heated urine sample. The test, if positive, will result in a raspberry pink or red color being absorbed onto the paper, which color is easily and readily observed by the person conducting the test. By means of using such strips the quantities of reagents employed in the test may be regulated much more precisely than has been the case in other methods. The test is simple, rapid, inexpensive and offers a high degree of reliability comparable to results obtained in the more complex, expensive and time-consuming rabbit or frog test.

What is claimed is:

1. A process for testing female urine to determine pregnancy which comprises heating in the urine at a pH below 6.5 a paper strip impregnated with a predetermined amount of iodine, the amount of iodine being related to the specific gravity of the urine sample and to the volume thereof in the manner shown on the accompanying graph, to produce a raspberry pink color on said strip indicating pregnancy when the test is positive.

2. The process of claim 1 wherein the paper strip is made of chromatographic paper.

3. A process for testing female urine to determine pregnancy which comprises heating in the urine at a pH below 6.5 a chromatographic paper strip impregnated with a predetermined amount of iodine, the amount of iodine being related to the specific gravity of the urine sample and to the volume thereof in the manner shown on the accompanying graph, to produce a raspberry pink color on said strip indicating pregnancy when the test is positive.

4. The process of claim 3 wherein the urine sample is maintained at a pH between 5 and 6.

5. The process for testing female urine to determine pregnancy which comprises heating in 2.5 ml. of the urine a chromatographic paper strip impregnated with a predetermined amount of iodine at a pH below 6.5 to produce a raspberry pink color on said strip indicating pregnancy when the test is positive, the amount of iodine in the strip being based on the particular specific gravity of the urine sample according to the parallelogram $A_1-B_1-C_1-D_1$ as shown on the accompanying graph.

References Cited by the Examiner

UNITED STATES PATENTS 2,912,309   11/1959   Free _____ 23—253

OTHER REFERENCES

Simola: "Z. Physiol. Chem.," vol. 278, pp. 92–96 (1943).

MORRIS O. WOLK, *Primary Examiner.*

DELBERT E. GANTZ, *Examiner.*